Jan. 24, 1967 R. E. SPENCER 3,300,230
INTEGRAL THRUST BEARING AND KINGPIN BUSHING SEAL
Filed Dec. 21, 1964

ROBERT E. SPENCER
INVENTOR

BY John R. Faulkner
Clifford L. Sadler

ATTORNEYS

3,300,230
INTEGRAL THRUST BEARING AND KINGPIN BUSHING SEAL
Robert E. Spencer, Taylor, Mich., assignor to Ford Motor Company, Dearborn, Mich., a corporation of Delaware
Filed Dec. 21, 1964, Ser. No. 419,691
5 Claims. (Cl. 280—96.1)

The present invention relates generally to front axle constructions for motor vehicles, and more particularly to an integral thrust bearing and kingpin bushing seal assembly for use in connection with such axles.

Front suspension systems for trucks are commonly of the nonindependent type having a solid front axle. A steering knuckle is supported at the outer ends of the axle by a vertically arranged kingpin which provides for steering movement of the knuckle about a generally vertical axis. A wheel spindle is integrally formed with the knuckle for the rotational support of a road wheel.

As stated, the kingpin supports the wheel for steering movement about a generally vertical axis. In order to facilitate this movement, lubricated bushings are provided between the kingpin and the steering knuckle. In addition, a thrust bearing may be provided to support a portion of the sprung mass carried by the axle upon the steering knuckle and the wheel.

For commercial reasons, the manufacturing processes for fabricating the axle and the steering knuckle permit a limited amount of clearance between the axle and the knuckle along the axis of the kingpin. Due to the presence of commercial tolerances, this clearance can become significant. In order to provide a satisfactory lubricating system for the kingpin bushings and the thrust bearings, it is necessary that the bushings and bearings remain sealed against the entry of contaminants even in the event there is clearance between the axle and the steering knuckle.

In view of the state of the art, it is the principal object of the present invention to provide an integral thrust bearing and kingpin bushing seal assembly that supports the sprung mass of the vehicle, and in addition, seals the end of the kingpin bushing.

More specifically, it is another object of the present invention to provide an improved thrust bearing assembly which cooperates with the steering knuckle and kingpin to seal the kingpin bushing against the entry of contaminants.

The many objects and advantages of the present invention will become amply apparent upon consideration of the following description and the accompanying drawings, in which.

Figure 1:
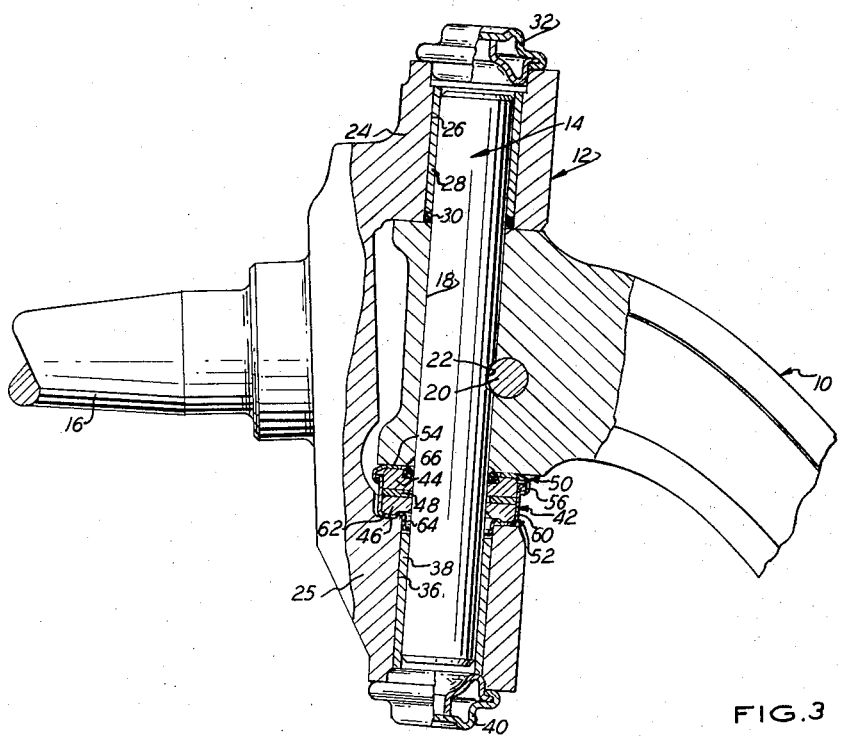
FIGURE 1 is an elevational view partly in section of a vehicle axle, a steering knuckle and kingpin construction incorporating the present invention.
Figure 3:
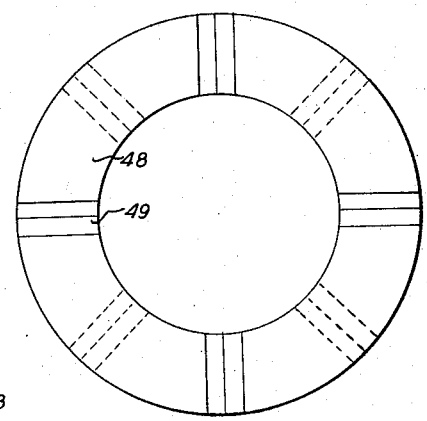
FIGURE 3 is a plan view of one of the thrust bearing elements.

Referring now to the drawings for a more complete understanding of this invention, FIGURE 1 discloses a portion of a front axle 10 for a motor vehicle such as a light truck. The axle 10 is pivotally connected to a steering knuckle 12 by means of a kingpin 14. The steering knuckle 12 has a spindle portion 16 for rotatably supporting a road wheel.

The kingpin 14 is secured within a bore 18 formed at the end of the axle 10 by means of a locking pin 20 which engages a notch 22 formed in the kingpin 14. The locking pin 20 extends generally tangentially to the bore 18 and the kingpin 14.

The steering knuckle has a bifurcated construction at its inner end with an upper portion 24 and a lower portion 25. The upper portion 24 is provided with a bore 26 that is in alignment with bore 18. The bore 26 surrounds the upper end of the kingpin 14 which protrudes from the bore 18 of the axle 10. A kingpin bushing 28 is interposed in the bore 26 of the steering knuckle adjacent to the kingpin 14. A resilient O-ring 30 is situated at the lower end of the bushing 28 and is positioned in the space between the bore 26 and the kingpin 14. The upper end of the bore 26 is sealed by a sheet metal cap 32 which is pressed into position.

Similarly, the lower end 25 of the steering knuckle 12 is provided with a bore 36 having a diameter greater than that of the kingpin 14. Bore 36 is also in alignment with bore 18. A cylindrical bushing 38 is interposed in the space between the kingpin 14 and the bore 36. The bushing 38 is held in place by a sheet metal plug 40 which also serves to seal the lower end of the bore 36.

An integral thrust bearing and kingpin bushing seal assembly 42 surrounds the kingpin 14. The assembly 42 supports the sprung mass of the vehicle carried by the axle 10 upon the steering knuckle 12. In addition, the assembly 42 seals the upper end of the bore 36 to protect the bushing 38 from contaminants.

The integral thrust bearing and kingpin bushing seal 42 comprises a pair of case hardened steel races 44 and 46 which have the general configuration of sheet metal washers. The races 44 and 46 are separated by and engage a bronze bearing element 48. Each of the radial sides of the bearing element 48 is provided with four spaced apart grease grooves 49. The grooves 49 aid in the circulation of lubricant.

The races 44 and 46, together with the bearing element 48, are retained as an assembled unit by means of interlocking bearing cases 50 and 52. The upper bearing case 50 has a radial portion 54 that rests flush against the end face of the upper bearing race 44. Case 50 is provided with a channel-shaped portion 56 along its side. The lower bearing case 52 has an outwardly turned flange 58 that is positioned within the channel 56. The interlocking fit of the flange 58 within the channel 56 permits the upper and lower cases 50 and 52 to rotate with respect to each other during steering movement of the knuckle 12 while, at the same time, preventing the entry of contaminants. The lower case 52 also has cylindrical and radial portions 60 and 62 which enclose the edges of the bearing races 44, 46 and bearing element 48.

Figure 2:
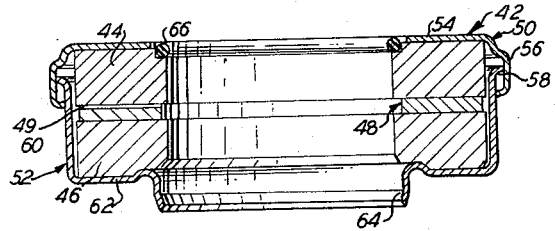
FIGURE 2 is an enlarged sectional view of the integral thrust bearing and kingpin bushing seal of FIGURE 1.

The case 52 has an axially extending flange portion 64. As seen in FIGURE 2, the flange portion 64 extends into the upper end of the bore 36. The flange 64 is of slightly greater diameter than that of the bore 36 so that it must be snapped into position. This action seals the case 52 against the adjacent portion 34 of the steering knuckle 12.

The upper race 44 is provided with a notch at its upper inner edge in which an O-ring 66 is seated. The O-ring is in sealed engagement with the kingpin 14.

The bearing case comprising the sheet metal parts 50 and 52 perform several functions. Firstly, it retains the several bearing elements 44, 46 and 48 together as an assembly so that fabrication of the construction illustrated in FIGURE 1 is facilitated. Rather than selecting and fitting two different bearing races and a bearing element separately about the kingpin, it is only necessary to position the single assembly 42. Because the case portion 52 has an axial flange 64 that engages the bore 36, the bearing assembly 42 is properly positioned with respect to the steering knuckle 12 and the kingpin 14. In addition, the flange 64 serves to seal the case 52 against the end face of the knuckle portion 25 which surrounds the bore 36. In the event there is excess clearance between the steering knuckle portion 25 and the axle 10, due to a tolerance stack-up or other causes, the assembly 42 will maintain the bushing 36 protected from contaminants.

The foregoing description constitutes the presently preferred embodiments of this invention. Modifications and alterations of the present invention may occur to those skilled in the art that will come within the scope and spirit of the following claims.

I claim:

1. A vehicle construction comprising an axle, a kingpin secured to said axle and having portions extending therefrom in a generally vertical direction, a steering knuckle adapted to rotatably support a road wheel and having a bifurcated portion pivotally engaging the extending portions of said kingpin, a bushing interposed between each of the extending portions of said kingpin and said steering knuckle, an integral thrust bearing and kingpin bushing seal assembly surrounding said kingpin and interposed between a portion of said steering knuckle and a portion of said axle, said assembly comprising a pair of rotatably connected casing members, one of said casing members having an axially extending portion surrounding said kingpin and holding said one casing member in sealed engagement with a portion of said steering knuckle, an O-ring sealing the junction between the other casing member and said kingpin, said casing members containing a plurality of thrust bearing components rotatably related to one another.

2. A vehicle construction comprising an axle, a kingpin secured to said axle and having portions extending therefrom in a generally vertical direction, a steering knuckle adapted to rotatably support a road wheel and having a bifurcated portion pivotally engaging the extending portions of said kingpin, a bushing interposed between each of the extending portions of said kingpin and said steering knuckle, an integral thrust bearing and kingpin bushing seal assembly surrounding said kingpin and interposed between a portion of said steering knuckle and a portion of said axle, said assembly comprising a pair of rotatably connected casing members, one of said casing members having an annular channel-shaped portion, the other of said casing members having a radial flange fitted into said channel-shaped portion, one of said casing members having an axially extending portion surrounding said kingpin and retaining said just mentioned casing member in sealed engagement with a portion of said steering knuckle, said casing members containing a plurality of thrust bearing washers rotatably related to one another.

3. A vehicle construction comprising an axle, a kingpin secured to said axle and having portions extending therefrom in a generally vertical direction, a steering knuckle adapted to rotatably support a road wheel and having a bifurcated portion pivotally engaging the extending portions of said kingpin, a bushing interposed between each of the extending portions of said kingpin and said steering knuckle, an integral thrust bearing and kingpin bushing seal assembly surrounding said kingpin and interposed between a portion of said steering knuckle and a portion of said axle, said assembly comprising a pair of rotatably connected casing members, one of said casing members having an annular channel-shaped portion, the other of said casing members having a radial flange fitted into said channel-shaped portion, an O-ring sealing the junction between said other casing member and said kingpin, one of said casing members having an axially extending portion surrounding said kingpin and retaining said just mentioned casing member in sealed engagement with a portion of said steering knuckle, said casing members containing a plurality of thrust bearing washers rotatably related to one another.

4. A vehicle construction comprising an axle member, a kingpin engaging said axle member, a steering knuckle member adapted to rotatably support a road wheel and having a portion engaging said kingpin, an annular space defined between one of said members and said kingpin, a bushing interposed in said space between said kingpin and said one member, an integral thrust bearing and kingpin bushing seal assembly surrounding said kingpin and interposed between a portion of said steering knuckle member and a portion of said axle member, said assembly comprising a pair of rotatably connected casing members, one of said casing members having an axially extending portion surrounding said kingpin and extending into said annular space adjacent to the end of said bushing, said axially extending portion being in sealed engagement with a portion of said one member, said casing members containing a plurality of thrust bearing components rotatably related to one another, sealing means sealing the other of said members and the other of said casing members.

5. A vehicle construction comprising an axle member, a kingpin engaging said axle member, a steering knuckle member constructed to rotatably support a road wheel and having a portion engaging said kingpin, an annular space defined between one of said members and said kingpin, a bushing interposed in said space between said kingpin and said one member, an integral thrust bearing and kingpin bushing seal assembly surrounding said kingpin and interposed between a portion of said steering knuckle member and a portion of said axle member, said assembly comprising a casing means having an axially extending portion surrounding said kingpin and extending into said annular space adjacent to the end of said bushing, said axially extending portion being in sealed engagement with a portion of said one member, sealing means engaging the other of said members and said casing means.

References Cited by the Examiner

UNITED STATES PATENTS

| | | | |
|---|---|---|---|
| 1,868,687 | 7/1932 | Bijur | 308—120 |
| 1,946,478 | 2/1934 | Bijur | 308—120 |
| 2,251,936 | 8/1941 | Heftler | 287—93 |
| 2,908,535 | 10/1959 | Runton et al. | 308—163 |
| 3,133,743 | 5/1964 | Mullin | 280—95 |
| 3,160,422 | 12/1964 | Enegren | 280—95 |

FOREIGN PATENTS 609,891   5/1926   France.

KENNETH H. BETTS, *Primary Examiner.*